UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

METHOD OF PREVENTING CRYSTALLIZATION OF A MELTED MASS OF CRYSTALS.

1,385,075. Specification of Letters Patent. Patented July 19, 1921.

No Drawing. Original application filed July 10, 1917, Serial No. 179,670. Divided and this application filed September 27, 1917. Serial No. 193,610.

*To all whom it may concern:*

Be it known that I, GEORGE E. FERGUSON, a citizen of the United States, and resident of the city, county, and State of New York, have invented certain new and useful Improvements in Methods of Preventing Crystallization of a Melted Mass of Crystals, of which the following is a specification.

This invention relates to a method of preventing crystallization of a melted mass of crystals or, more particularly, to a method of retaining salts containing water of crystallization dissolved in their own water of crystallization as long as desired.

This application is a divisional application from my application for chemical heat generator, filed July 10th, 1917, under Ser. No. 179670.

When salts of this kind crystallize, subsequent to being dissolved in their own water of crystallization, heat is generated by such crystallization, as is well known.

While efforts have been made to construct heat generators making use of such crystallizable salts no heat generator has been devised which would permit of the salts, after first being melted to dissolve them in their water of crystallization by the application of heat, being retained in such melted or liquid condition until the generation of heat is desired.

A solution of a crystallizable salt dissolved in its own water of crystallization, or, in other words, a melted mass of crystals, is in a very unstable condition when the solution cools and is subject to an impulse, which has hitherto been found to be practically unpreventable, and resolves itself into crystal formation, such crystallization being brought about by the action of any outside influence on the liquid mass, such as a shock to the container, a supercooling of the liquid mass, the introduction of solid particles of foreign matter, long contact with the air, or the introduction of one or more crystals of the same composition as that of the liquid mass. Heaters making use of crystallizable salts were only reliable, therefore, for use immediately after heat was applied thereto to melt the salts.

The most serious difficulty, as far as the retaining of the salts in such melted condition in a heat generator use was concerned, lay in the fact that a jarring or abrupt movement of the container containing the melted salts produced crystallization of the latter and no means or method was known by which crystallizing of the liquid mass during ordinary handling of the container could be prevented.

Furthermore, as far as any practical use in a heat generator of this kind was concerned, any means which might be discovered for holding such salts in melted condition would have to be of a nature which allowed of the salts being caused to crystallize at any desired time and then subsequently being again melted and held in such melted condition and the operation repeated as desired.

After considerable experiment and observation I discovered that if the liquid mass was inclosed in a container in a manner which would exclude air therefrom and prevent movement of the liquid mass as a whole in the container and prevent any agitation or impact or blow between any portion of the liquid and the surrounding surfaces of the container, the latter might be subjected to any handling, jolting or jarring, or the liquid mass remain for an indefinite length of time in such container, or be supercooled below room temperature, without any danger of crystallization.

In effecting this sealing there were certain conditions, the consideration of which was essential. Since a disturbance of the liquid mass after cooling would result in crystallization, it was very desirable that the mass be sealed while in a heated condition and that the seal would still remain good after subsequent shrinkage of the liquid mass which occurs upon cooling.

Since the use of any mechanical sealing device, even were one worked out to fulfil all the above conditions, would add to the manufacturing cost, such devices were eliminated from consideration. Attention was directed to the use of organic sealing materials which would be solid at normal temperatures and which would melt easily and be easily ruptured.

Experiments were made with the various commercial waxes as a sealing medium for the mouth of the container but it was found that they could not be relied upon to fulfil the above conditions. For the heater to be of practical use it was desirable that the seal should be automatically reapplied by the simple heating of the container to melt the crystals, after any previous use of the heater.

Experiments with paraffin wax, both hard, medium and soft, were first made. Then all the other known commercial waxes and then combinations of these waxes, were tried. These experiments were tried under the conditions in which the heater would actually have to be used, that is to say, the wax and crystallizable material were heated together in a suitable container. These waxes fulfilled certain of the conditions in that they were of less specific gravity than the melted mass of crystals and were insoluble therein and would, therefore, always float on top of the latter, but there were other conditions which they did not satisfactorily meet. During cooling of the liquid mass a certain amount of shrinkage thereof occurs and it was found that these waxes or combination of waxes could not be relied upon with certainty to adhere with requisite firmness to the sides of the container mouth or neck while at the same time possessing sufficient elasticity or pliability to follow the liquid mass closely as it shrinks while cooling.

Moreover, as these waxes themselves contract while cooling, (and since cooling naturally takes place from the exterior of any mass toward the center) the shrinking of the wax as it solidified with comparative quickness along the surfaces thereof in contact with the walls of the container tended to produce minute indentations or scorings in the surface of the wax which left spaces therebetween and the container walls, which spaces were liable to form a connecting passage between the container walls and wax seal, leading from the exterior thereof to the liquid mass.

Finally a mixture of paraffin wax and lanolin was obtained which fulfilled the required condition, adhering closely to the walls of the container as the liquid crystal mass cools, having substantially the same melting point as the crystals and also cooling at about the same rate of speed as the latter, while it does not shrink upon cooling.

Various crystallizable salts may, of course, be employed as desired in the heat generator, my invention not being limited in its application to any specific salts or combination of salts. I have found that a combination of four parts of sodium acetate with three molecules water of crystallization and one part of sodium thiosulfate with five molecules of water of crystallization was satisfactory for use in a chemical heat generator.

I found also that the construction of the container had, in one respect, a bearing on the preventing of crystallization. It was found desirable that the walls of the container be sufficiently rigid to withstand all ordinary shocks or jars or blows, to which it might be subjected in use, without any buckling, bending or indentation thereof.

In my parent application, of which this case is a division, I have illustrated my invention applied to a heat generator adapted more particularly for use in place of the well known "hot water bag" to apply external heat to a desired portion of the body of the user, the container as there shown being of flattened circular shape, but any desired departure from the shape and construction there shown may be followed.

In the original preparation of the heater, the crystallizable material and the sealing material, may be introduced in any form into the container. The container may be filled to the desired point with the uncrystallized salt or salts while a sealing material, such as paraffin wax and lanolin, may be introduced together or separately.

Upon heat being applied to the container, which may conveniently be done by immersing the latter in boiling water, both the salts and the sealing material are melted. The sealing material, because of its being of less specific gravity, remains or floats upon the top of the melted crystals and, upon the container being left to cool in an upright position, the sealing material solidifies and forms a seal over the liquid mass which effectually holds the liquid against agitation and relative movement and prevents crystallization thereof.

The salts and sealing material can be melted separately and introduced in melted form into the container or other methods employed for assembling the salts and sealing material in the container, as desired.

When it is desired to cause the generation of heat, it is only necessary to pierce the sealing material with any sharp or pointed instrument, or otherwise break the seal, when the introduction of the piercing instrument, causing a disturbance or impact between the particles of the liquid, and the admission of air to the liquid will cause crystallization, with a resultant generation of heat, or if crystallization is slow in starting it can be hastened by shaking the container after the piercing of the seal.

The generator is again put in condition for future service by reheating (by immersion in hot water or otherwise) to melt the crystals and sealing material, and then allowing it to remain undisturbed till the melted crystals cool and the sealing material solidifies.

With the melted mass of crystals sealed in the container as above described, the mass is entirely excluded from the atmosphere, while any impact or relative movement and friction between the various particles thereof, or between the liquid mass of melted crystals and the walls of the container, is prevented. This effectually prevents the crystallization of the liquid, regardless of the handling of the container, until it is desired to start the action again as above described.

What I claim is:—

1. The method of preventing crystallization of a melted mass of crystals which consists in causing said melted mass of crystals and a melted sealing substance of less specific gravity and adapted to solidify at normal temperature to be held while in heated condition in a container, and simultaneously cooling and causing a seal to be applied to said melted mass of crystals holding the same in melted form against relative movement in said container.

2. The method of preventing crystallization of a melted mass of crystals which consists in inclosing said melted mass of crystals in a manner to prevent agitation thereof by simultaneously melting therewith a sealing substance having substantially the same melting point as that of the crystals but of less specific gravity and adapted to solidify at normal temperature, and simultaneously cooling said melted crystals and sealing substance.

3. The method of preventing crystallization of a melted mass of crystals which consists in inclosing said melted mass of crystals in a manner to exclude air therefrom and prevent agitation thereof by simultaneously melting therewith a sealing substance having substantially the same melting point as that of the crystals but of less specific gravity and adapted to solidify at normal temperature, and simultaneously cooling said melted crystals and sealing substance.

4. The method of preventing crystallization of a melted mass of crystals which consists in inclosing said melted mass of crystals while in heated condition in a container, and applying thereto a seal adapted to solidify and maintain contact with the said melted mass during the cooling and shrinking of the latter without rupture of the seal.

5. The method of preventing crystallization of a melted mass of crystals which consists in causing said melted mass of crystals to be held while in heated condition in a container and sealing said melted mass with a molten seal of organic material which solidifies while cooling to normal temperature.

6. The method of storing heat which consists in simultaneously heating in a container a substance containing water of crystallization and a sealing substance of lesser specific gravity which solidifies at normal temperature and allowing said substances to cool in said container.

7. The method of preventing crystallization of a liquid substance which consists in causing said substance to be held in a container while in heated condition and sealing said container simultaneously with the cooling of the substance with a material which when solidified has a greater strength of adhesion with the walls of the container than of cohesion between the particles thereof while in a semi-solid condition.

8. The method of preventing crystallization of a liquid substance which consists in causing said substance to be held in a container while in a heated condition and sealing said container simultaneously with the cooling of the substance with a material maintaining contact with the surface of said substance, as the latter shrinks while cooling without movement of the particles of the material in engagement with the wall of the container relatively to said wall.

9. The method of preventing crystallization of a melted mass of crystals which consists in causing said melted mass of crystals to be held while in heated condition in a container, melting normally solid organic sealing material and causing said melted sealing material to rest upon said melted mass of crystals while the latter is in heated condition, and cooling said melted crystals and sealing material.

10. The method of preventing crystallization of a melted mass of crystals which consists in causing said melted mass of crystals to be held while in heated condition in a container, and sealing said container with a molten mixture of wax and a substance having a greater plasticity than the wax.

11. The method of preventing crystallization of a melted mass of crystals which consists in causing said melted mass of crystals to be held while in heated condition in a container, and sealing said container with a molten mixture of paraffin wax and lanolin.

12. The method of preventing crystallization of a melted mass of crystals which consists in causing said melted mass of crystals to be held while in heated condition in a container, applying a normally solid sealing substance to said melted mass of crystals while in heated condition, and cooling said melted mass of crystals, said sealing substance maintaining contact with the entire exposed surface of said melted mass of crystals while cooling and, upon solidifying, preventing relative movement of any portions thereof.

13. The method of preventing crystallization of a melted mass of crystals which consists in causing said melted mass of crystals to be held while in heated condition in a container, applying a sealing means thereto of melted organic material having substantially the same melting point as the mass of crystals, and cooling said melted crystals and seal.

14. The method of preventing crystallization of a melted mass of crystals which consists in causing said melted mass of crystals to be held while in heated condition in a container, applying a sealing means thereto composed of a molten seal adapted to solidify upon cooling and prevent movement of the melted mass of crystals as a whole in said container and relative movement between portions thereof, and cooling said melted crystals and seal.

15. The method of preventing crystallization of a melted mass of crystals which consists in causing said melted mass of crystals to be held while in heated condition in a container, applying a sealing means to said melted mass of crystals composed of a molten material which solidifies at normal temperature and adheres to the walls of the container upon solidifying, and cooling said melted crystals and seal.

Signed at the city, county and State of New York, this 25 day of September, 1917.

GEORGE E. FERGUSON.